Dec. 28, 1948.   A. G. RICHARDSON ET AL   2,457,178
RESISTANCE SINE WAVE GENERATOR
Filed Dec. 6, 1943   2 Sheets-Sheet 1
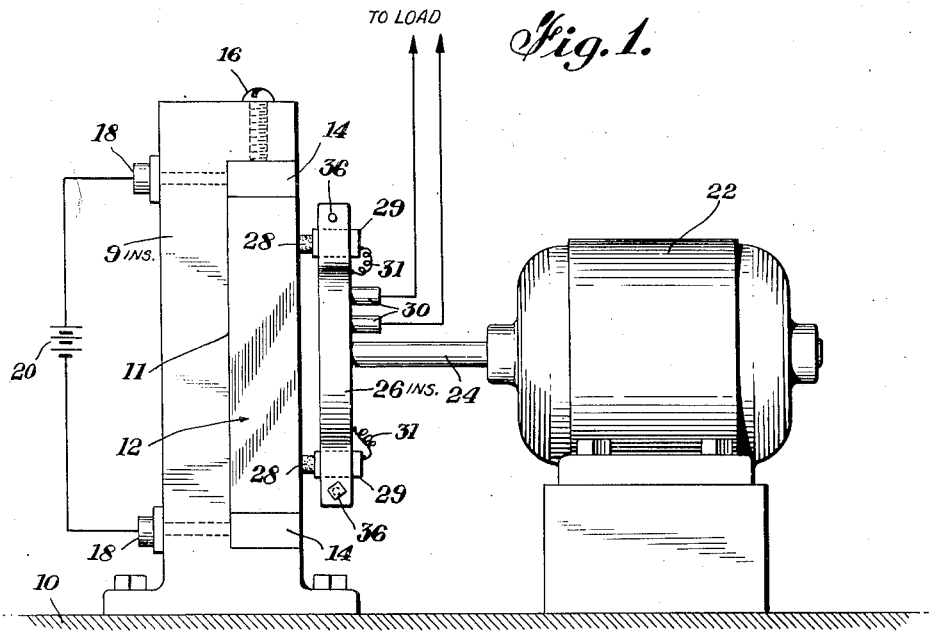
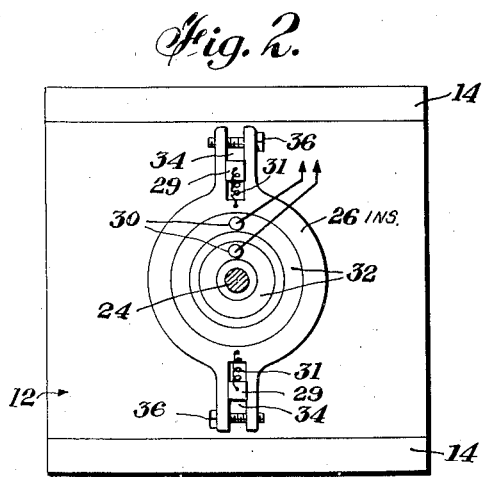 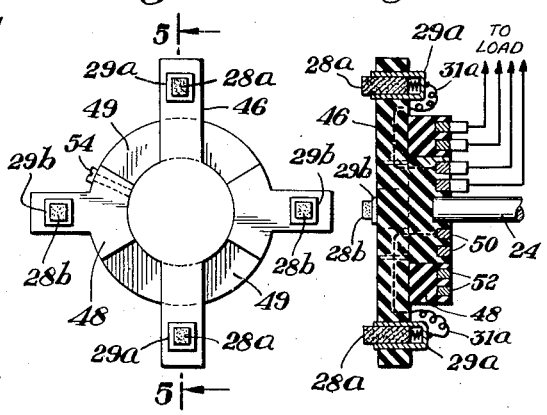
INVENTORS
AVERY G. RICHARDSON
TREVOR H. CLARK
BY
ATTORNEY Dec. 28, 1948.  A. G. RICHARDSON ET AL  2,457,178
RESISTANCE SINE WAVE GENERATOR
Filed Dec. 6, 1943  2 Sheets-Sheet 2
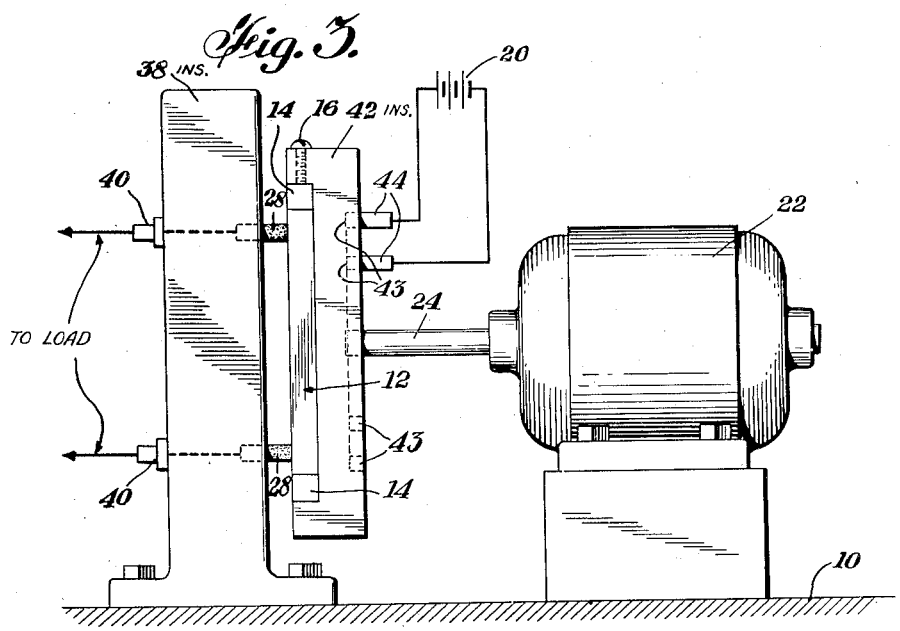
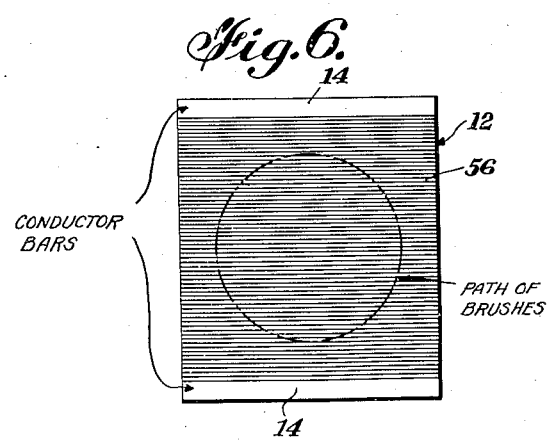
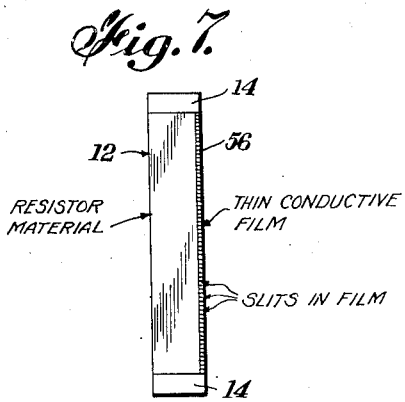
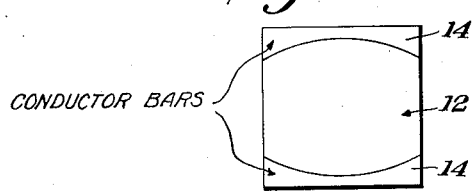
INVENTORS
AVERY G. RICHARDSON
TREVOR H. CLARK
BY
ATTORNEY Patented Dec. 28, 1948

2,457,178

UNITED STATES PATENT OFFICE 2,457,178

RESISTANCE SINE WAVE GENERATOR

Avery G. Richardson, Boonton, N. J., and Trevor H. Clark, New York, N. Y., assignors to Federal Telephone and Radio Corporation, New York, N. Y., a corporation of Delaware Application December 6, 1943, Serial No. 513,198

3 Claims. (Cl. 175—364)

Our invention relates to converters, and more particularly to a device for transforming a direct voltage into an alternating voltage.

For numerous purposes, for example for use as a sweep control for a cathode ray tube, it is desirable to have a mechanism which will convert a direct voltage into a single or polyphase alternating voltage, the frequency and instantaneous phase of which is a direct function of the angular position of a rotating shaft. Such an apparatus has been made by using an annular resistance element, or a commutator having a relatively large number of segments with an individual resistor between each two adjacent segments and suitable relatively rotatable brush contacts. Due to the fact that the resistance must be graded, or the individual resistors must be of various values to produce a sinusoidal output, this type of converter is difficult to accurately construct and the cost has naturally been high.

It is an object of our invention therefore to provide a simple and inexpensive device for converting a direct voltage into an alternating voltage.

It is a further object of our invention to provide means for converting a direct voltage into an alternating voltage, the frequency and instantaneous phase of which is a direct function of the angular position of a rotating shaft.

According to a feature of our invention, we provide means for obtaining a pure sine wave output from a resistor by connecting the resistor to a source of direct current, positioning a pair of brushes in contact with the resistor, and producing a relative rotary movement between the resistor and the brushes.

According to a further feature of our invention, we provide for a variation in the amplitude of the voltage obtained from such a device by changing the spacing between the brushes.

An additional object of the invention is to provide such a device with a second pair of brushes for producing a second sine wave output, and to permit adjustment of the phase of the two wave outputs by altering the relative angular position of the two pairs of brushes.

The invention may further provide means for reducing the wear resulting from the pressure of the brushes against the resistor by utilizing a series of parallel conducting members positioned on the surface of the resistor at right angles to the direction of current flow, so that such members act as commutating segments.

Other objects and advantages will be apparent from the following description of a preferred form of the invention and from the drawings, in which:

Fig. 1 is a side elevational view of a preferred form of apparatus embodying the present invention;

Fig. 2 is a front elevational view of certain of the elements of Fig. 1;

Fig. 3 is a side elevational view of a modification of Fig. 1, showing an alternative means for producing relative rotation between the resistor and brush members;

Fig. 4 is a plan view of a modified form of brush holder for use in the mechanism of Fig. 1;

Fig. 5 is a sectional view of Fig. 4 along the line 5—5;

Fig. 6 is a plan view showing a series of commutating segments applied to the surface of the resistor of Figs. 1 and 2;

Fig. 7 is a side elevational view of Fig 6; and

Fig. 8 is a plan view of a modified form of the resistor and conducting bar assembly of Figs. 1 and 2.

In Fig. 1 is shown a resistor housing 9 composed of insulating material and supported on a base 10. Housing 9 is formed with a cut-out portion 11 adapted to receive a block or sheet of homogeneous resistance material 12, as illustrated. This resistance material 12 may comprise, for example, carbon or carbon Bakelite, and may be of any degree of thickness necessary or desirable. If a sheet relatively thin is employed, a backing of insulating material may be added for support and to prevent distortion. Two bars or strips 14 composed of conducting material such as copper overlie the upper and lower ends of the block. Resistor 12 and its two end bars 14 preferably but not necessarily constitute a unitary assembly, this assembly being inserted into the cut-out portion 11 of housing 9 and held in place by suitable means such as a screw 16.

Two binding posts 18 on the rear surface of housing 9 are connected to a suitable source of direct current such as battery 20. These binding posts in turn are respectively connected in any conventional manner to conducting bars 14 as indicated in Fig. 1. By means of this construction direct current from source 20 will be fed to the upper and lower ends of resistor block 12, and due to the homogeneous nature of the resistance material and the spreading effect of conducting bars 14, the current flow through the resistor will be substantially evenly distributed. Thus, equi-potential lines will be created which will be straight and parallel to the bars 14.

Also shown in Fig. 1 is a motor or other source of power 22 mounted on base 10. The shaft 24 of motor 22 drives a brush holder 26 which holds two square-shaped brushes 28 in insulatingly spaced-apart relation and in frictional engagement with resistor 12. Brushes 28 are provided with square-shaped spring caps 29 in a conventional manner. Shaft 24 is perpendicular to the surface of the resistor, so that upon rotation of the shaft brushes 28 will describe a circular path on its surface.

Fig. 2, which is a front elevational view of a portion of Fig. 1, shows two oppositely-disposed U-shaped openings 34 formed in brush holder 26, these openings 34 respectively receiving the brushes 28, with their caps 29. Due to the shape of the openings, the brushes may be adjusted in a radial direction so as to change their radial spacing both with respect to each other and to the shaft 24. A pair of screws 36 are respectively associated with the U-shaped openings 34, so that the sides of the openings may be pinched together to hold the brush caps 29 in any selected position. Furthermore, due to the square shape of the caps 29, the brushes 28 are prevented from turning or twisting within openings 34.

Caps 29 are electrically connected respectively to a pair of slip rings 32, by means such as leads 31, these leads being partially molded within holder 26. A second pair of brushes 30 are associated with slip rings 32, and these latter brushes are in turn connected to a load as indicated in Fig. 1.

It is believed that the operation of the device of Figs. 1 and 2 will now be clear. It has been stated that the current flow through resistor 12 is substantially uniform, creating equi-potential lines which, in the drawing, will be horizontal. When brushes 28 are rotated about the axis of shaft 24 by motor 22, they will cut these equi-potential lines at varying rates depending upon the speed of rotation of the shaft and the instantaneous position of the brush holder. With proper adjustment of the brushes the voltage output delivered to the load will be substantially in the form of a sine wave, having its maximum when the brush holder is in the postion shown (vertical) and its minimum when the holder is in horizontal position. Adjustment of the brushes 28 radially by loosening of screws 36 will change the potential drop across the brushes and correspondingly the amplitude of the wave output.

In Fig. 1 the relative movement between the resistor block and its contacting brushes is produced by rotating the brushes. However, it may be desirable to instead rotate the resistor while the brushes remain stationary. In such circumstances the structure of Fig. 3 may be employed. In this figure is shown a stationary support 38 on base 10 positioning the two brushes 28 in insulatingly spaced-apart relation. The brushes 28 are connected respectively to two binding posts 40 in turn connected to a load.

Shaft 24 of motor 22 now rotates a housing 42 rigidly secured to the shaft. Housing 42 is formed of any suitable insulating material. A cut-out portion is provided in housing 42 to receive resistor 12 with its conducting end bars 14 in the same manner that the resistor assembly is received in the cut-out portion 11 of housing 9 in the device of Fig. 1. Screw 16 performs the similar function in both figures of positioning the resistor block within the cut-out portion.

A pair of slip rings 43 formed integral with housing 42 are respectively connected to conducting bars 14 in any suitable manner. A pair of brushes 44 connected to source of direct current 20 contact slip rings 43 as illustrated. The electrical output of the structure of Fig. 3 is similar in all respects to that of Fig. 1. If desired, means may be provided for changing the radial position of brushes 28 in support 38 so that the amplitude of the wave output may be altered in a manner similar to that resulting from an adjustment of the screws 36 of Fig. 2.

Figs. 4 and 5 show a modified form of brush holder for producing a polyphase voltage output. Two pairs of square-shaped brushes 28a and 28b are provided respectively with spring caps 29a and 29b. Brushes 28a and caps 29a are mounted on a support 46 rigidly secured to shaft 24 as shown in Fig. 5. Brushes 28b and caps 29b are mounted on a ring-shaped support 48 partially encircling a flanged portion of support 46. Support 48 has two arcuate recessed portions 49.

Whereas support 46 is rigidly secured to shaft 24, support 48 is not secured to the shaft and has a limited amount of angular movement relative to support 46 within the boundaries of recessed portion 49 as shown in Fig. 4. The relative position of members 46 and 48 may be maintained by means of a screw 54 receivable in an opening in support 48.

Each of the brush supports 46 and 48 is equipped with a pair of slip rings 50 and 52 respectively to which the brush caps 29a and 29b are connected in any suitable manner, the caps 29a being illustrated as connected to slip rings 50 by a pair of leads 31a which are partially molded within support 46. Further brushes connected to a load are associated with slip rings 50, 52 as shown in Fig. 5. By altering the angle between brushes 28a and 28b the phase relation of the voltage outputs can be varied. If the two sets of brushes are positioned 90° apart then the second voltage will obviously be 90° out of phase with the first voltage.

Means may obviously be provided in the structure of Figs. 4 and 5 for changing the spacing between the brushes of each pair. This adjustment may be obtained, if desired, by an arrangement similar to that shown in Fig. 2.

The structure of Figs. 4 and 5, while intended for use with the apparatus of Figs. 1 and 2, may be modified to permit its use in conjunction with the mechanism shown in Fig. 3. That is, the four brushes may be stationary while the resistor rotates. Such a modification would involve only the proper positioning of a second set of brushes in support 38. One advantage to be derived from such an arrangement is that only two slip rings need be employed instead of four required by the structure of Fig. 5.

If it becomes necessary to minimize the wear on the resistor surface resulting fom the pressure of the brush members, an arrangement such as that shown in Figs. 6 and 7 may be employed. In these figures, the surface of the resistance material is covered with a film or layer of conducting material such as copper. This conductive film, such as 56 in Figures 6 and 7, is relatively thin in comparison with the resistor 12. A series of closely-spaced parallel slits are then cut in this conducting film at right angles to the direction of current flow through the resistor. Thus the resulting strips of conducting material act as commutator segments in contact with the brush members. Since adjacent strips are not in contact with one another, the uniform distribution of current along the surface of resistor 12 is maintained, and the voltage output from the device will not be affected.

The layer 56 may consist of a separate sheet of conducting material applied directly to the surface of resistor 12 in conjunction with an adhesive, or the surface of the resistor may be coated with a conducting film by the spray process and then engraved with a series of closely spaced parallel lines. It is also within the scope of the invention to provide other commutating devices, such for example as a wire wound spirally around the resistor 12 and then cut at every turn, or else a number of parallel spaced-apart conductive bars or strips maintained in any known manner on the surface of the resistor. Clearly other devices may also be employed which serve as equi-potential conducting elements in contact with the brush members, any of which may be substituted for the specific means illustrated or mentioned herein.

It is realized that sinusoidal output voltage is possible only with high impedance loads. When current is drawn by the load, it is possible to secure empirical correction by shaping the conductor bars 14 at the ends of resistor 12 as shown in Fig. 8. With the ends of the conducting bars 14 bent inwardly, and the adjacent surfaces of the resistance material made in convex form to correspond therewith, then the vertical potential drops along the resistor will vary from maximum at the center to minimum at the two sides. By proper shaping of the bars 14 with respect to any given load, a pure sine wave output can be obtained.

While we have described above the principles of our invention in connection with specific apparatus and particular modifications thereof, it is to be clearly understood that this description is made only by way of example and not as a limitation on the scope of our invention as set forth in the objects of our invention and the accompanying claims.

We claim:

1. In combination with a load consuming a substantial amount of current, a converter for supplying true sine wave alternating current energy from a direct current source to said load, which comprises a flat resistance unit and output brushes movably engaging the face of said unit over a cyclic path, said unit consisting of a block of resistance material of uniform thickness and composition terminating at each of two opposite edges in a strip of highly conductive material, the junction line between the resistance block and each conductive strip and said cyclic path being so relatively shaped as to provide a true sine wave output potential at said brushes when direct current is supplied to the conductive strips and alternating current flows to the load.

2. A converter according to claim 1, wherein the path of said brushes is circular and said conductive strips and resistance block are shaped to present a junction line between said strips and block which enables correction for potential drops from said conductive strips to said movably engaging brushes due to flow of load current, thereby effecting a substanial sine wave output when said load draws current.

3. A converter according to claim 1, wherein the conductive strips are shaped so that said junction lines are curved with concavity toward said brushes.

AVERY G. RICHARDSON.
TREVOR H. CLARK.

REFERENCES CITED

The following references are of record in the file of this patent:

UNITED STATES PATENTS

| Number | Name | Date |
|---|---|---|
| 597,002 | Jewell | Jan. 11, 1898 |
| 1,003,676 | Wantz | Sept. 19, 1911 |
| 1,201,687 | Bullock | Oct. 17, 1916 |
| 1,244,614 | Koppitz | Oct. 30, 1917 |
| 1,764,347 | Pullwitt | June 17, 1930 |
| 1,944,329 | Langley | Jan. 23, 1934 |
| 1,992,410 | Benkelman | Feb. 26, 1935 |
| 2,042,334 | Fisher et al. | May 26, 1936 |